United States Patent Office 2,901,377
Patented Aug. 25, 1959

2,901,377

WALL SURFACING AND METHOD OF MAKING THE SAME

Hans Bode, Moers (Rhine), Germany, assignor to M. Belmont Ver Standig, Inc., a corporation of Maryland No Drawing. Application August 11, 1954
Serial No. 449,249

8 Claims. (Cl. 117—70)

The present invention relates to facings and facing material for walls and method of making the same. More particularly, the present invention relates to novel and improved wall surfaces and methods of making the same which are very durable, relatively inexpensive and readily applicable to any sturdy masonry wall.

A principal object of the present invention is the provision of a quasi-tile or quasi-ceramic wall facings and methods of making the same which may be produced in place and carried out without special skill.

Further objects of the present invention include:

(1) The provision of a tile-like facing for walls or wall-like structures which may be applied without great difficulty and without any extensive preparation of the surface.

(2) The provision of a facing for walls which has a very neat, aesthetic appearance and which may be readily cleaned or washed, if so desired.

(3) The provision of a new and improved facing for walls of substantial thickness and method of making the same which utilizes cement or similar binding material and which avoids the danger of minute cracks or hair-thin crevices in the surface thereof after the cement is permitted to dry.

(4) The provision of a facing for walls which has the appearance of tiles, ceramic, stone or enamel, which may be made in any single or multi-colored plan, and which can be made to simulate the appearance and characteristics of these products quite closely with relatively inexpensive materials.

(5) The provision of a tile-like facing and material for walls and method of making the same which is substantially non-porous, durable and substantially impermeable to water, which will normally withstand heat and cold and which may be produced in a variety of patterns, designs and textures.

(6) The provision of a mineral coating having a tile-, stone- or enamel-like appearance.

(7) The provision of a mineral coating using cement as a matrix binder which does not flake and which is particularly weather resistant.

(8) The provision of a method for facing of walls wherein several layers are applied on top of each other, the application being performed either manually or, preferably, by spraying, e.g., with a low pressure gun, or both.

(9) The provision of varied multi-color pigment schemes for a wall facing by using different colors with the several aforementioned layers whereby the layers are kept of sufficiently small thickness to permit all the colors to be visible at the surface interface.

These and other objects and advantages of the present invention will become more clear from the following description of several preferred embodiments of the present invention which are stated herein for purposes of illustration only.

Broadly speaking, the present invention may be realized by the application to the walls, either manually or, preferably, by spraying or brushing controlled quantites of a paste-like mixture comprising cement and an alkaline earth metal chloride, or earth metal chloride, e.g., calcium chloride, magnesium chloride or aluminum chloride. The application of this paste-like mixture is preceded and followed by the application of primers and other layers which comprise polymerized synthetic resins, particularly polymerized vinyl alcohol resins, polymerized acrylic type resins, polymerized styrene resins, polyvinyl acetate resins, cellulose ethers or esters, and polyvinyl ester resins, such as polyvinyl acetate, or mixtures thereof. Suitable filler material, such as china clay, quartz flour, fibrous magnesium silicate, inorganic fillers and the like, may be included in one or more of the layers.

Color pigments, plasticizers, hardening agents and other additives may be added to these mixtures as desired.

Moreover, if a different surface is desirable, asbestos fibers, rock wool, or similar material may also be added.

For a better understanding of the wall facing of the present invention and the particular method of making the same, reference will now be made to some typical examples for use with different wall structures. In these examples, all parts or percentages are by weight unless otherwise specified.

When applied to any hard, durable and suitable base, such as cement stucco, lime stucco or gypsum stucco, a first primer is applied in order to close the stucco surfaces so as to prevent absorption of the water contained in the layers to be subsequently applied to the surface and to provide improved bonding of the subsequent coatings or layers. The first primer may be applied either by hand, as by means of a brush, or may also be sprayed onto the wall. The first primer comprises a synthetic, film-forming resin, preferably a polyvinyl acetate resin, a polyacrylic acid ester resin or a mixture of such resins, and a suitable solvent or dispersing medium to form a liquid composition.

A typical example of such a first primer is as follows:

40% of a polyvinyl acetate resin solution, such as Polyco 309–50 marketed by the American Polymer Company.
20% of a solvent, such as normal butylacetate, and
40% of a thinner, such as toluene.

This first primer is permitted to dry for several hours until completely dry before a second primer is applied.

Another typical example for the first primer is as follows:

36% of a polyacrylic acid ester resin emulsion, e.g., the trade named product Rhoplex A-33, marketed by Rohm and Haas Company.
16% of a polyvinyl acetate emulsion, marketed, for example, by the American Polymer Company under the trade name of Polyco 470.
48% of water.
One part per thousand of a defoamer, such as oil or silicone resin.

Upon drying of the first primer, a second primer is applied, the purposes of which are to enhance adhesion of the subsequent layers of the wall surfacing as well as to assure proper sealing of the base surface, even in those places which might have been sparingly covered by the application of the first primer.

The second primers of this invention comprise a film forming synthetic resin, e.g., a polyvinyl ester resin, a polyacrylic acid ester resin, a cellulose ester, a cellulose ether or a mixture of such resins, a powdered, water-insoluble inorganic material, e.g. cement, pumice, silica flour, ground quartz or mixtures thereof, and a suitable solvent or dispersing medium to form a liquid composition.

This second primer is also necessary and of importance for reasons of chemical interaction of the first primer with the subsequent paste-like mixture of the main layer forming the wall surfacing, which would occur without the second primer.

A typical example of the second primer is as follows:

30% of a polyvinylacetate resin emulsion (55 percent by weight of resin), as marketed, for example, by the American Polymer Company under the name of Polyco 117 SS.
2% of methyl cellulose.
8% of a polyvinylacetate solution, such as marketed by the American Polymer Company under the name Polyco 309–50.
22% of a thinner, such as toluene.
38% of water.

A powder consisting of pumice flour and white Portland cement in equal quantities is added to this solution of the second primer in the ratio of 1 to 5 parts of the powder for 10 parts, and particularly 2 parts of powder for 10 parts of the second primer solution, i.e., the ratio of powder to resin solids in the primer is between about 1 to 3 and 5 to 3.

This second primer is then again applied either manually, as, for example, by means of a brush, or is sprayed on top of the first primer.

The second primer is permitted to dry before the layer constituting the facing properly speaking is applied thereon.

After the second primer has completely dried, the principal layer of the surfacing is applied thereon, preferably by spraying with a low pressure gun or by hand. The paste-like mixtures of this invention which are used to form the principal layer of the wall facings or surfacings of this invention comprise a Portland type cement, an alkaline earth metal or earth metal chloride or mixture thereof, a filler material, e.g., clay, sand, quartz, titanium dioxide or the like, and water.

A typical example of the composition for the wall facing, properly speaking, is approximately as follows:

65% of white Portland cement.
8% of asbestos fibers.
8% of aluminum silicate.
8% of kaolin.
8% of quartz flour.
3% of titanium dioxide.

The aforementioned powder is then mixed with a solution of 3% calcium chloride solution in water at an approximate ratio of one part by weight of this solution with two parts by weight of the powder.

A suitable amount of cement admix of approximately one part by weight to protect the surface against cracking and to permit the use of less water may be added to the paste-like mixture, such as, for example, Plastiment.

While the facing is still damp, the desired colored pigments or dyes are either applied by hand or sprayed thereon. One simple way of applying the coloring material is by the use of a stipple which is held in one hand, and by means of a stick of wood, steel or the like, held in the other hand in front of the brush against which the brush is swung whereby the coloring material is spattered into the facing surface with sufficient force upon the impact of the brush with the stick. Coloring material pigments which are resistant to cement and lime are used.

By applying the coloring material while the wall facing is still damp small recesses or indentations are formed therein in which the color pigments are set whereby the uneven texture obtained by the use of asbestos fibers is further roughened. By reason of the fact that the surfaces are not dry the colors tend to flow together.

Ordinarily a layer of between about 1 to 3 mm. thickness of the aforementioned paste-like mixture gives satisfactory results.

If a somewhat smoother finish is desired than that obtainable with the aforementioned mixture, the asbestos fibers may be omitted therefrom. In that case, a typical illustrative example for a paste-like mixture for forming the wall facing properly speaking is as follows:

80% of white Portland cement.
5% of titanium dioxide.
7.5% of fibrous magnesium silicate, marketed by the International Talc Company, under the name of "Asbestine."
7.5% of aluminum silicate.

A cement admix, such as White Plastiment, may be added to the powder in the quantity of about 1% to prevent cracking of the cement during drying and to permit the use of less water.

The powder resulting from this last-mentioned example is then thoroughly mixed with a 3% calcium chloride solution in water at an approximate ratio of one part by weight of the solution to two parts of the powder.

A particularly favorable result may be obtained by the addition to the solution of 2% by weight of lime soap powder consisting of equal amounts of unslaked lime and soap paste.

A layer having a thickness of between about 1 to 2 mm. is preferable with this last-mentioned example of wall surfacing.

Furthermore, a plurality of layers of the paste-like mixtures may also be applied on top of each other, and the color pigments may be directly added to each layer, if desired. Where a plurality of paste-like, cement mixtures are used, each subsequent layer is applied to the previous layer while the latter is still wet. If each layer is relatively thin, the different colors remain visible from the surface.

Again the color materials may be applied manually with a brush, as described above, or may be sprayed into the still wet wall facing, thereby forming small recesses or indentations over the entire surface.

The main surfacing layer or layers are permitted to dry completely after which they may be sanded, if so desired, either by hand or machine. Since the initial surface after drying is relatively uneven or rough by reason of the particular application of the color pigments and/or by reason of the inclusion of asbestos fibers in the powder, the sanding of the surface will make reappear the natural color of the powder which will contrast with the color materials applied thereon.

After the sanding operation a top sealing coat is applied, either manually or by gun to provide a sealer for the final glossy finish and to provide a surface which has the same porosity in spite of uneven drying.

The sealing coats of this invention comprise a film-forming synthetic resin, e.g., cellulose esters, cellulose ethers, polyvinyl ester resins, polyvinyl acetate resins, polyacrylic acid ester resins, epoxy resins, styrene resins or mixtures thereof and a suitable solvent or dispersing medium to form a liquid mixture.

A typical example of the sealing coat is as follows:

20 parts of a styrene resin powder emulsion.
One part of methyl cellulose.
10 parts of dibutylphthalate.
69 parts of water.

After the sealing coat has dried completely a final glazing coat may be applied thereon to provide a finish for the surface. Either a glossy or flat finish may be obtained depending only on the choice of the solutions. The glazing coats of this invention comprise film-forming synthetic resins, which are substantially craze resistant, upon exposure to weather and sunlight, e.g., polyvinyl ester resins, polyacrylic acid ester resins, epoxy resins or mixtures thereof, and a solvent or dispersion medium which does not dissolve the sealing coat to which the glazing coat mixture is applied. Typical examples of glazing coats are as follows:

30 parts of polyacrylic resin solution (40% by weight of solid in toluene).
16 parts of polyvinylacetate solution (50% ethyl acetate solid).
2 parts of butylglycolate.
6 parts of diacetone alcohol.
16 parts of cyclohexanone.
30 parts of ethyl alcohol.
5 parts of aluminum stearate.

The last-stated example provides a flat surface. However, if it is desired to obtain a glossy finish, it is only necessary to omit the aluminum stearate from the glazing mixture.

The wall facing in accordance with the present invention is applicable to any type of strong, hard wall, such as steel, wood, cement, gypsum or similar material.

If applied to cinderblocks it is advisable to first apply a stucco or other surface thereto by using a mixture of, for example, one part of cement and three to four parts of sand and lime, the latter in approximately equal quantities.

If applied to a steel surface, instead of using the first primer composition given hereinbefore, the steel surface may be coated with an anti-rust primer, such as, for example, a lead pigment primer.

Moreover, the wall facing, properly speaking, may be given any texture, while still wet, by imprinting into the surface designs, such as texture-like designs, which may be obtained by the use of a brush or rollers having patterns in the surfaces of the rolls.

The amount of filler in the paste-like wall facing mixtures may be varied so as to vary the hardness of the resulting surface. The less filler used, the harder and the less flexible and pliant the surface becomes. Suitable filler materials include clays, e.g., kaolin, china clay, or the like, silica containing materials, e.g., sand, quartz flour, ground glass, diatomaceous earth, fuller's earth or the like, fibrous materials, e.g., asbestos, fibrous magnesium silicate, glass fibers, or the like, and inorganic oxides, salts or the like, e.g., titanium oxide, calcium carbonate, calcium sulfate, and magnesium oxide. The paste-like mixtures preferably contain about between 65 and 80 parts of cement for each 20 to 35 parts of filler to form a powder which is mixed with a water solution of an earth metal or alkaline earth metal chloride in a ratio of the water solution to powder of the order of 1 to 2.

The film-forming synthetic resins used to form the various coatings of this invention can be of various types. They are chosen to produce films which are tough and resistant to decomposition by aging, exposure to heat, sun and weather. The resins should not be so hard as to easily chip nor so soft as to easily mar to deform under pressure. Examples of usable synthetic resins include, acrylic type resins, e.g., polymethyl methacrylate, polymethyl acrylate, polybutyl methacrylate, polyamyl acrylate and similar polymers or copolymers; polyvinyl type resins, e.g., polystyrene, polyvinyl acetate, polyvinyl chloride, polyvinyl butycol, polyvinyl formal, and similar polymers or copolymers; cellulose esters, e.g., celulose acetate, cellulose butycoate or the like; cellulose ethers, e.g., methyl cellulose, benzyl cellulose or the like and epoxy type resins, e.g., the condensation product from Bisphenol A and epichlorohydrin.

Various plasticizers known to the art may be incorporated in the resin mixtures if desired, but best results are obtained if mixtures of synthetic resins are used to obtain the desired degree of film flexibility rather than by the use of plasticizers.

The film-forming synthetic resins are employed in liquid compositions. These may be formed using organic solvents and thinners or non-solvent emulsion or dispersion forming liquids, e.g., water. Examples of usable solvents include benzene, toluene, xylene, naphtha, acetone, alcohol, ethyl acetate, butyl actate, butyl glycolate, methyl ethyl betone, methyl amyl betone or the like. Mixtures of organic solvents having different boiling points are used with advantage to give controlled evaporation of solvent during the spraying or other coating operation.

I claim:

1. The method of producing a wall surfacing comprising the steps of applying to the wall a first primer comprising a film-forming synthetic resin selected from the group consisting of polyvinyl ester resins and polyacrylic ester resins, or a mixture thereof, thereupon applying a second primer comprising a film-forming synthetic resin selected from the group consisting of polyvinyl ester resins, polyacrylic ester resins, cellulose esters, and cellulose ethers, or a mixture thereof, applying a paste-like mixture comprising Portland-type cement to form the layer of greatest thickness in said wall surfacing, applying a sealing coating comprising a film-forming synthetic resin selected from the group consisting of cellulose esters, cellulose ethers, polyvinyl ester resins, polyacrylic ester resins, epoxy resins, and styrene resins, or mixtures thereof over said cement containing layer, and thereupon applying a glazing coating comprising a film-forming substantially craze resistant synthetic resin selected from the group consisting of polyvinyl ester resins, polyacrylic ester resins and epoxy resins or mixtures thereof.

2. The method of producing a wall surfacing comprising the steps of applying to the wall a first liquid primer which consists essentially of a film-forming synthetic resin base in a liquid medium selected from the group consisting of polyvinyl acetate resin and polyacrylic acid ester resin, or a mixture thereof, thereupon applying a second liquid primer which consists essentially of a film-forming, synthetic resin base selected from the group consisting of polyvinyl ester resin, polyacrylic acid ester resin, cellulose ester and cellulose ether, or a mixture thereof and a powdered, water insoluble inorganic material in a ratio of resin to inorganic material of between about 1 to 3 and 5 to 3 parts by weight, applying a paste-like mixture consisting essentially of Portland type cement, a filler and an alkaline earth metal chloride to form the layer of greatest thickness in said wall facing, the quantity of cement in said paste-like mixture being between about 65 and 80 parts by weight for each 20 to 35 parts of filler, applying over said cement containing layer a liquid sealing coating consisting essentially of a film-forming synethetic resin in a liquid medium selected from the group consisting of cellulose esters, cellulose ethers, polyvinyl ester resins, polyvinyl acetate resins, polyacrylic acid ester resins, epoxy resins, and styrene resins, or mixtures thereof; and thereupon applying glazing coating consisting essentially of a film-forming synthetic resin in liquid medium which does not dissolve said sealing coating selected from the group consisting of polyvinyl ester resins, polyacrylic acid ester resins and epoxy resins, or mixtures thereof.

3. A multi-layer wall surfacing comprising a first primer consisting essentially of film-forming resin selected from the group consisting of polyvinyl ester resins, and polyacrylic ester resins, or mixtures thereof, a second primer consisting essentially of film-forming resin selected from the group consisting of polyvinyl ester resins, polyacrylic ester resins, cellulose esters and cellulose ethers, or mixtures thereof, a third layer comprising Portland-type cement to form the layer of greatest thickness in said wall surfacing, a sealing coating over said cement-containing layer consisting essentially of film-forming synthetic resin selected from the group consisting of cellulose esters, cellulose ethers, polyvinyl ester resins, polyacrylic ester resins, epoxy resins, and styrene resins, or mixtures thereof, and a glazing coating comprising a film-forming synthetic resin selected from the group consisting of polyvinyl ester resins, polyacrylic ester resins, and epoxy resins, or mixtures thereof.

4. A multi-layer wall surfacing comprising a first liquid primer which consists essentially of a film-forming synthetic resin base in a liquid medium selected from the group consisting of polyvinyl ester resins, and polyacrylic ester resins, or mixtures thereof, a second liquid primer which consists essentially of a film-forming, synthetic resin base selected from the group consisting of polyvinyl ester resins, polyacrylic ester resins, cellulose esters and cellulose ethers, or mixtures thereof and a powdered, water insoluble inorganic material in a ratio of resin to inorganic material of between about 1 to 3 and 5 to 3 parts by weight, a third layer which constitutes the layer of principal thickness consisting essentially of Portland type cement, a filler and an alkaline earth metal chloride, the quantity of cement in said third layer being between about 65 and 80 parts by weight for each 20 to 35 parts of filler, a liquid sealing coating consisting essentially of a film-forming synthetic resin in a liquid medium selected from the group consisting of cellulose esters, cellulose ethers, polyvinyl ester resins, polyacrylic ester resins, epoxy resins, and styrene resins, or mixtures, and a glazing coating consisting essentially of a film-forming synthetic resin in liquid medium which does not dissolve said sealing coating selected from the group consisting of polyvinyl ester resins, polyacrylic ester resins and epoxy resins, or mixtures thereof.

5. The method of producing a wall facing comprising the steps of applying to the wall a first primer comprising a film-forming synthetic resin selected from the group consisting of polyvinyl acetate resin and polyacrylic acid ester resin, or a mixture thereof, thereupon applying a second primer comprising a film-forming synthetic resin selected from the group consisting of polyvinyl ester resin, polyacrylic acid ester resin, cellulose ester, and cellulose ether, or a mixture thereof and a powdered water-soluble inorganic material, applying a paste-like mixture comprising Portland type cement, a filler and a chloride selected from the group consisting of earth metal chlorides and alkalines earth metal chlorides to form a layer of greatest thickness in said wall surfacing, applying over said cement-containing layer a sealing coating comprising a film-forming synthetic resin selected from the group consisting of cellulose esters, cellulose ethers, polyvinyl ester resins, polyvinyl acetate resins, polyacrylic acid ester resins, epoxy resins, and styrene resins, or mixtures thereof, and thereupon applying a glazing coat comprising a film-forming substantially craze resistance synthetic resin selected from the group consisting of polyvinyl ester resins, polyacrylic acid ester resins and epoxy resins, or mixtures thereof.

6. A multi-layer wall surfacing comprising a first primer layer consisting essentially of film-forming resin selected from the group consisting of polyvinyl acetate resin, and polyacrylic acid ester resin, or a mixture thereof, a second primer layer consisting essentially of film-forming resin selected from the group consisting of polyvinyl ester resin, polyacrylic acid ester resin, cellulose ester and cellulose ether, or a mixture thereof and a powdered, water-soluble inorganic material, a third layer which constitutes the layer of principal thickness of said surfacing consisting essentially of Portland type cement, a chloride selected from the group consisting of alkaline earth metal and earth metal chlorides, and a filler, a sealing coating thereon consisting essentially of film-forming synthetic resin selected from the group consisting of cellulose esters, cellulose ethers, polyvinyl ester resins, polyvinyl acetate resins, polyacrylic acid ester resins, epoxy resins and styrene resins, or mixtures thereof, and a glazing coating comprising a film-forming synthetic resin selected from the group consisting of polyvinyl ester resins, polyacrylic acid ester resins and epoxy resins, or mixtures thereof.

7. The method of producing a wall surfacing comprising the steps of applying to the wall a first primer comprising a film-forming synthetic resin selected from the group consisting of polyvinyl ester resins and polyacrylic ester resins or mixtures thereof, thereupon applying a second primer comprising a film-forming resin selected from the group consisting of polyvinyl ester resins, polyacrylic ester resins, cellulose ester resins and cellulose ether resins, or a mixture thereof, applying a paste-like mixture comprising Portland type cement and a chloride selected from the group consisting of earth metal chlorides and alkaline earth metal chlorides to form a layer of greatest thickness in said wall, and thereafter applying at least one further coating comprising a film-forming synthetic resin selected from the group consisting of polyvinyl ester resins, polyacrylic ester resins, and epoxy resins, or mixtures thereof.

8. A multi-layer wall surfacing comprising a primer layer consisting essentially of film-forming resin selected from the group consisting of polyvinyl ester resins, and polyacrylic ester resins, or mixtures thereof, a second primer layer consisting essentially of film-forming resin selected from the group consisting of polyvinyl ester resins, polyacrylic ester resins, cellulose esters and cellulose ethers, or mixtures thereof, a third layer which constitutes the layer of principal thickness of said surfacing consisting essentially of Portland type cement and a chloride selected from the group consisting of alkaline earth metal and earth metal chlorides, and at least one further coating thereon consisting essentially of film-forming synthetic resin selected from the group consisting of polyvinyl ester resins, polyacrylic ester resins, and epoxy resins, or mixtures thereof.

References Cited in the file of this patent

UNITED STATES PATENTS

| | | |
|---|---|---|
| 855,081 | Whipple | May 28, 1907 |
| 2,286,767 | Shutt | June 6, 1942 |
| 2,422,665 | Fredrickson | June 24, 1947 |
| 2,644,771 | Kempthorne | July 7, 1953 |
| 2,760,885 | Larsen | Aug. 28, 1956 |

FOREIGN PATENTS

| | | |
|---|---|---|
| 422,051 | Great Britain | Dec. 21, 1934 |